(12) United States Patent
Cotter et al.

(10) Patent No.: US 7,093,709 B2
(45) Date of Patent: Aug. 22, 2006

(54) BELT CONVEYOR

(75) Inventors: David H Cotter, Coopersville, MI (US); Kenneth J Kooistra, Byron Center, MI (US); Curtis E LeMay, Shelbyville, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/975,199

(22) Filed: Oct. 27, 2004

(65) Prior Publication Data

US 2005/0056524 A1    Mar. 17, 2005

Related U.S. Application Data

(62) Division of application No. 10/358,690, filed on Feb. 5, 2003, now Pat. No. 6,811,018.

(60) Provisional application No. 60/424,629, filed on Nov. 7, 2002, provisional application No. 60/356,045, filed on Feb. 11, 2002.

(51) Int. Cl.
    *B65G 23/04* (2006.01)
(52) U.S. Cl. .................. 198/835; 198/810.01; 198/834
(58) Field of Classification Search ............ 198/460.1, 198/810.01, 812, 817, 835, 834, 831
    See application file for complete search history.

(56) References Cited

U.S. PATENT DOCUMENTS

| | | | |
|---|---|---|---|
| 3,075,630 A | 1/1963 | Fisk | 198/76 |
| 3,122,935 A * | 3/1964 | Morling | 198/840 |
| 3,291,288 A | 12/1966 | Haustovich | |
| 3,485,339 A | 12/1969 | Miller et al. | 198/34 |
| 3,608,703 A | 9/1971 | Hitchcock et al. | 198/810.01 |
| 3,627,108 A | 12/1971 | Hansen | 198/102 |
| 3,722,660 A * | 3/1973 | Snead | 177/16 |
| 3,808,658 A * | 5/1974 | Looney | 198/840 |
| 3,930,573 A | 1/1976 | Wyman | 198/809 |
| 3,938,313 A * | 2/1976 | Marzocchi | 57/207 |
| 3,942,625 A | 3/1976 | Snead | 198/810.01 |
| 3,995,735 A | 12/1976 | Risley | 198/425 |
| 4,047,444 A * | 9/1977 | Jeffrey | 474/148 |
| 4,061,223 A * | 12/1977 | McGinnis | 198/821 |

(Continued)

FOREIGN PATENT DOCUMENTS

DE    28 14 436 A1    10/1979

(Continued)

OTHER PUBLICATIONS

Supplementary European Search Report dated Mar. 15, 2005 for European Application No. EP 03 73 9711 (1 page).

*Primary Examiner*—Gene Crawford
*Assistant Examiner*—Rashmi Sharma
(74) *Attorney, Agent, or Firm*—Van Dyke, Gardner, Linn & Burkhart, LLP

(57) ABSTRACT

A belt conveyor or belt accumulator includes at least two tandem zones, each of which is defined by a motorized roller and at least one idler roller positioned along and between opposite sidewalls of the conveyor and a continuous belt routed around the motorized roller and the idler roller or rollers. The motorized roller is operable to drive the belt around the rollers to move articles along the respective zone. The belt may have a low modulus characteristic and may be initially stretched at least 0.75% in its lengthwise direction when the belt is reeved or routed around the rollers. The motorized roller of each zone may be independently operable, such as in response to an article sensor at each zone, to convey or accumulate articles on the respective zone of the belt conveyor.

26 Claims, 7 Drawing Sheets

U.S. PATENT DOCUMENTS

| | | | |
|---|---|---|---|
| 4,140,216 A * | 2/1979 | Conrad | 198/835 |
| 4,227,607 A | 10/1980 | Malavenda | 198/460 |
| 4,797,602 A * | 1/1989 | West | 322/10 |
| 4,832,186 A * | 5/1989 | Conrad | 198/840 |
| 4,869,360 A | 9/1989 | Brown et al. | 198/460.1 |
| 5,022,644 A | 6/1991 | Burge | 271/270 |
| 5,038,917 A * | 8/1991 | Kronseder | 198/444 |
| 5,058,727 A | 10/1991 | Jahns et al. | |
| 5,070,995 A | 12/1991 | Schaffer et al. | 198/460.1 |
| 5,083,655 A | 1/1992 | Becker | 198/460.1 |
| 5,137,139 A | 8/1992 | Ruscello | 198/460 |
| 5,213,202 A * | 5/1993 | Arnold | 198/835 |
| 5,285,887 A | 2/1994 | Hall | 198/460 |
| 5,341,915 A | 8/1994 | Cordia et al. | 198/460 |
| 5,442,248 A * | 8/1995 | Agnoff | 310/71 |
| 5,582,286 A | 12/1996 | Kalm et al. | 198/781.06 |
| 5,620,084 A * | 4/1997 | Mensch | 198/834 |
| 5,957,263 A | 9/1999 | Espenschied | 198/349.95 |
| 6,029,800 A | 2/2000 | Kratz et al. | 198/835 |
| 6,244,421 B1 | 6/2001 | Hall | 198/460.1 |
| 6,244,427 B1 * | 6/2001 | Syverson | 198/788 |
| 6,253,906 B1 * | 7/2001 | Hall | 198/460.1 |
| 6,378,694 B1 | 4/2002 | Onoyama et al. | |
| 6,811,018 B1 * | 11/2004 | Cotter et al. | 198/460.1 |

FOREIGN PATENT DOCUMENTS

| | | |
|---|---|---|
| DE | 4115327 | 11/1992 |
| EP | 1199262 | 10/2001 |
| FR | 2 425 394 | 12/1979 |
| JP | 2000318825 | 11/2000 |

* cited by examiner

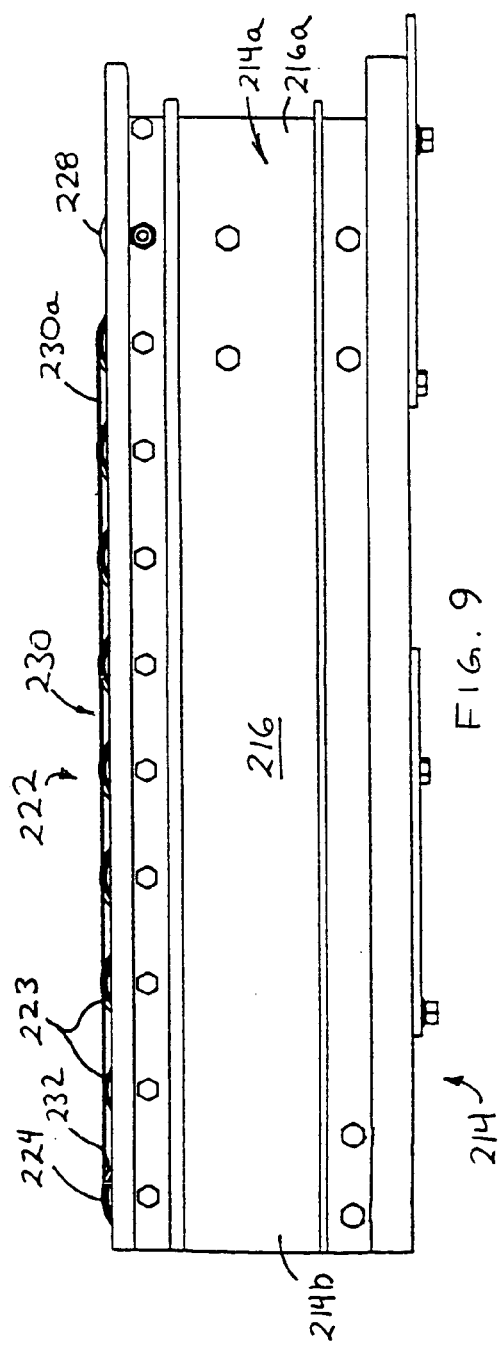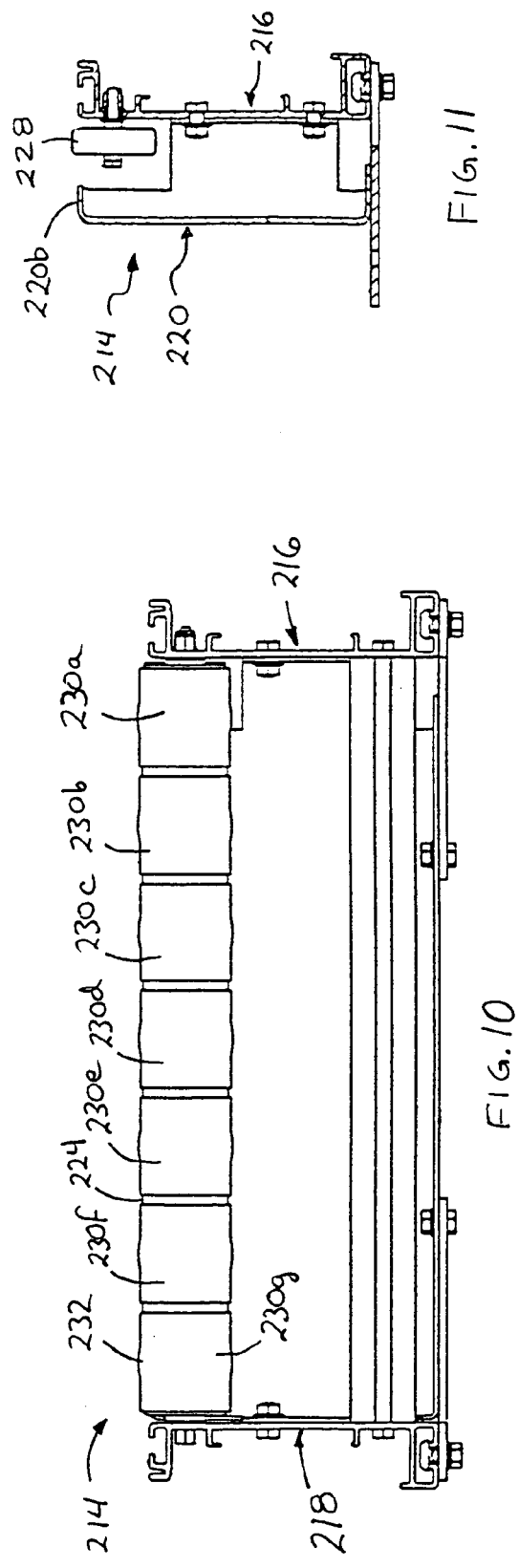

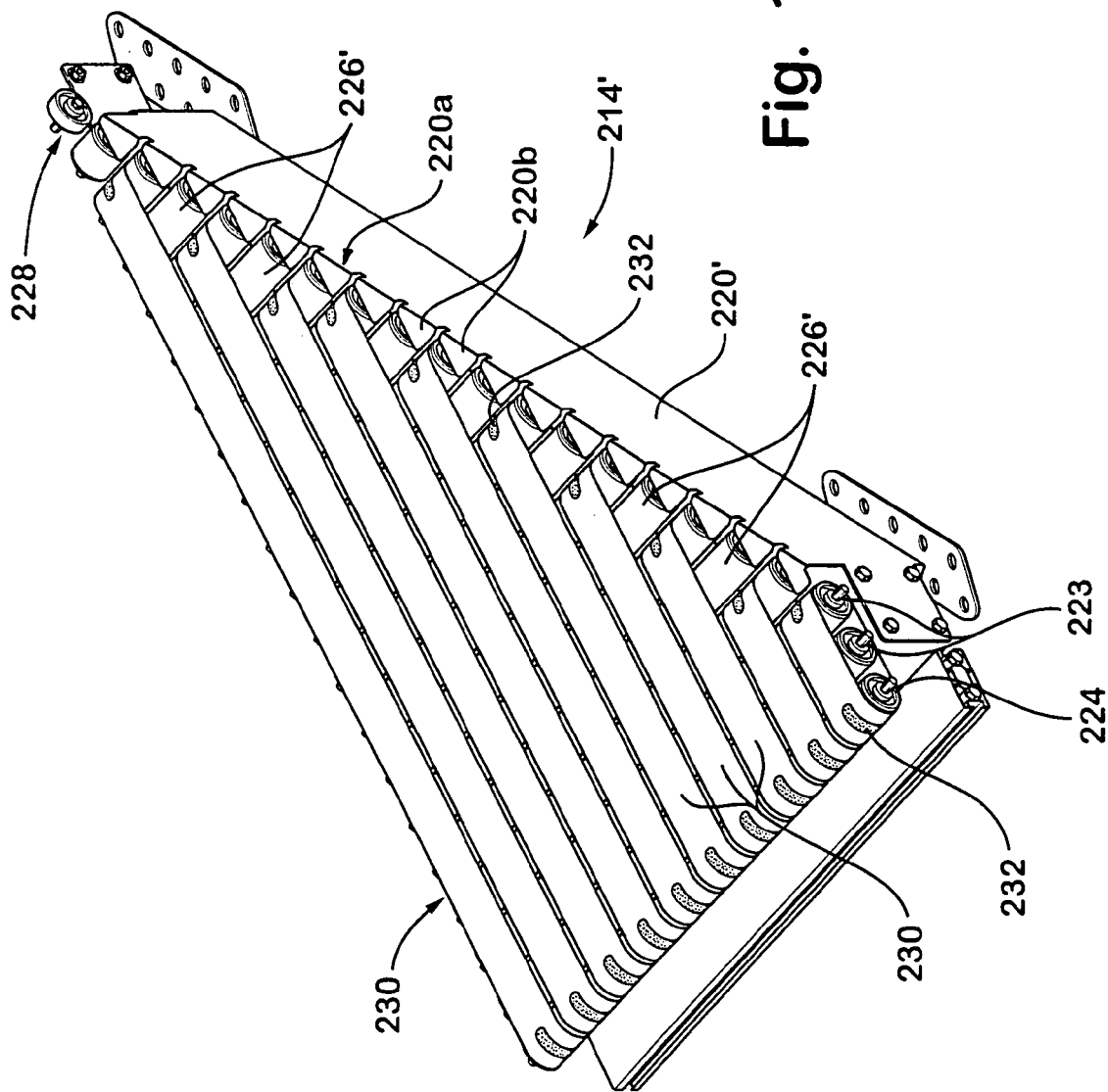

BELT CONVEYOR

CROSS-REFERENCE TO RELATED APPLICATIONS

The present application is a division of U.S. patent application, Ser. No. 10/358,690, filed Feb. 5, 2003 by Cotter et al., now U.S. Pat. No. 6,811,018, which claims priority of U.S. provisional applications, Ser. No. 60/356,045, filed Feb. 11, 2002 by Cotter et al., and Ser. No. 60/424,629, filed Nov. 7, 2002 by Cotter, which are hereby incorporated herein by reference in their entireties.

FIELD OF THE INVENTION

The present invention relates generally to conveyors and, more particularly, to belt conveyors. The present invention also relates generally to angled conveyor sections which are positioned at an angle with respect to a conveyor or transport system to induct or discharge articles onto or off from the conveyor or transport system.

BACKGROUND OF THE INVENTION

It is known to provide zones of rollers along a roller conveyor, where each zone includes a motorized roller and a plurality of idler or freely rotating rollers. The motorized roller is typically operable to drive the idler rollers via a plurality of O-rings connecting each roller to an adjacent roller in the zone. Each zone may be independently operable to accumulate articles on a particular zone or zones or to generally continuously convey articles along the zones of the roller conveyor. However, such roller conveyors are not suitable for certain applications where belt conveyors are desired, such as for conveying small articles which may fall between the rollers or for applications where a belt conveyor may be required or desired for other reasons. Also, due to the low friction between the rollers and the articles being conveyed thereon, such roller conveyors are not suitable for providing accumulation of articles along an inclined or declined section of the roller conveyor.

Also, it is known to provide an angled discharge junction or connecting conveyor section at a discharge conveyor or station of a sorting system. The discharge junctions typically comprise a plurality of different length rollers rotatably mounted between a sidewall of the junction and an angled mating or connecting frame, such that the rollers are positioned in an ascending length order to define an angled mating edge or connection at the sorting system conveyor or transport path. The rollers are typically freely rotating rollers and function to transport articles from the transport or sorting system to a discharge conveyor or station at the opposite end of the angled junction. Articles are discharged from the transport system and may coast over the different length rollers and onto the discharge conveyor or station. It is also known to provide angled belted conveyor sections where a continuous belt is reeved around rollers and is operable to induct or discharge articles at a main conveying path or transport path. However, such angled belted conveyor sections typically include complicated routing paths for the belt beneath the conveyor section to properly align and track the belt around an end roller at the angled mating edge of the angled belted conveyor section.

SUMMARY OF THE INVENTION

The present invention provides a belt conveyor which is suitable for continuously conveying articles along the conveyor or along segments or zones of the conveyor, and/or for accumulating articles on the individual segments or zones, and may provide for accumulation of articles on an incline or a decline.

The present invention provides a belt conveyor which may include a plurality of segments or zones, each of which includes a continuous belt routed around a plurality of rollers. Each of the zones of the conveyor includes a motorized roller and at least one idler roller and may be independently operable to move articles along the belt conveyor or to accumulate articles on one or more of the zones of the belt conveyor. The present invention also provides an angled belt strip roller conveyor section which is positionable at a conveyor or transport path or system, such as a belt conveyor or a roller conveyor, to induct or discharge articles onto or off from the transport system. The angled conveyor section comprises a plurality of different length rollers arranged to define the angled mating end of the angled conveyor section and a plurality of different length belt strips reeved or routed or positioned around the rollers and the motorized roller.

According to an aspect of the present invention, a belt conveyor includes a motorized roller and at least one idler roller positioned along and between opposite sidewalls of the conveyor and a continuous belt reeved around the motorized roller and the idler roller or rollers. The motorized roller is operable to drive the belt around the rollers to move articles along the belt conveyor. The belt has a low modulus characteristic. There may be at least approximately a 0.75% initial stretch to the belt in a lengthwise direction of the belt when the belt is reeved or positioned around the rollers. The low modulus characteristic of the belt may provide approximately a 2% to 4% or more stretch capability or characteristic to the belt.

The belt conveyor may comprise two or more zones, which may be independently operable to allow for accumulation of articles at one or more zones along the belt conveyor. Each zone may include an article sensor, which is operable to detect articles on the belt of the respective zone, whereby the motorized roller of each zone is operable in response to the sensor and the particular application of the segmented belt conveyor.

Optionally, the belt conveyor may be implemented at an incline or a decline, and may be operable to accumulate articles on the incline or decline. Optionally, the belt conveyor may be operable to feed stacks of trays to a tray destacking apparatus at an induct of a tray handling system or tray management system at a mail sortation assembly. It is further envisioned that the belt conveyor may be implemented on an extendable loader or unloader for loading or unloading articles at a trailer or the like. Clearly, the belt conveyor may be implemented in other applications, without affecting the scope of the present invention.

According to another aspect of the present invention, a belt accumulator comprises opposite sidewalls and at least two tandem zones. Each of the tandem zones comprises a motorized roller and at least one idler roller rotatably mounted at and between the opposite sidewalls, a continuous belt reeved around the motorized roller and the at least one idler roller, and at least one article sensor operable to detect articles in that zone. The continuous belt of each of the tandem zones comprises a low modulus characteristic. The belt is initially stretched in a lengthwise direction of the belt at least 0.75% when the belt is reeved around the rollers. The belt accumulator includes at least one control which is operable to control the motorized roller of each zone to drive the belt to convey articles along the respective zone. The control is operable to selectively and independently control the motorized rollers in response to the article sensors to provide accumulation of articles in the zones of the belt accumulator.

According to another aspect of the present invention, a belt conveyor comprises opposite sidewalls, a motorized roller and at least one idler roller rotatably mounted at and between the opposite sidewalls, a continuous belt reeved around the motorized roller and the idler roller or rollers, and at least one article sensor operable to detect articles on the belt. The motorized roller comprises an internal motor operable to rotatably drive a roller portion of the roller relative to an axle portion of the roller. The motorized roller is operable to drive the belt to convey articles along the belt conveyor. The motorized roller is selectively operable in response to the article sensor or sensors.

The belt conveyor may comprise at least two tandem zones. The motorized roller of each of the tandem zones may be operable independently from other motorized rollers of other tandem zones to provide accumulation of articles at one or more of the tandem zones. The motorized roller may be selectively and independently operable in response to an article sensor at each zone to provide accumulation of articles in the zones of the belt conveyor.

The continuous belt may comprise a low modulus characteristic, which provides approximately a 1.5% or more stretch characteristic to the belt, and may provide approximately a 2% or 4% or more stretch characteristic to the belt. The belt may have at least approximately a 0.75% initial stretch in a lengthwise direction of the belt when the belt is reeved or positioned around the rollers.

According to another aspect of the present invention, an angled conveyor section is configured to be positioned along a main transport path to convey articles, which are discharged from the transport path, away from the transport path. The angled conveyor section is positionable at an angle relative to the transport path and comprises opposite sidewalls and an angled frame portion defining an angled mating edge of the angled conveyor for positioning adjacent to a side of the transport path. The angled conveyor section also comprises a plurality of rollers including a motorized roller and a plurality of idler rollers. At least some of the idler rollers have different lengths from the other rollers. A plurality of belt strips are reeved around some of the rollers. The different length rollers are mounted to the angled frame portion and one of the sidewalls and arranged in ascending length order along the angled conveyor to define an angled roller conveying surface. At least some of the belt strips have different lengths from other belt strips and are reeved around the motorized roller and different ones of the different length rollers. The belt strips and the rollers define a belted conveying surface along the angled conveyor section with an angled mating edge positionable adjacent to the transport path.

The motorized roller may be positioned at an end of the angled conveyor section opposite from the angled frame portion. The motorized roller or one or more of the other rollers may include a plurality of tracking devices operable to track the plurality of belt strips on the motorized roller. At least some of the different length rollers may include corresponding tracking devices operable to track respective ones of the plurality of belt strips on the different length rollers. The tracking devices may comprise strips or crowns around the respective rollers.

The belt strips may have a low modulus characteristic and may have at least approximately a 0.75% initial stretch in their lengthwise direction when the belt strips are reeved or positioned around the rollers. The low modulus characteristic of the belt strips may provide approximately a 2% to 4% or more stretch capability or characteristic to the belt strips.

Therefore, the present invention provides a belt conveyor which may have a plurality of independently operable zones or segments, each of which includes a continuous conveyor belt driven by a motorized roller. The zones may operate together as a generally continuously running belt conveyor or may operate individually as an accumulating conveyor with zone control and photo eyes or sensors. The present invention thus provides a zone controlled belt conveyor which may operate in a similar manner as a zone controlled roller conveyor, but with a conveyor belt reeved around the motorized roller and idler rollers rather than with multiple O-rings or the like connecting the idler rollers to the motorized roller of each zone. The belt conveyor of the present invention thus is capable of accumulating articles on an incline or decline. Because the motorized roller of each zone may only control or drive a small belt section or zone, the load and wear on the motorized roller is minimized to provide a longer life cycle for the motorized roller.

The angled conveyor section of the present invention provides a substantially continuous, belted conveying surface at an angle for abutting or mating against a conveying or transport path. The angled conveyor section includes a motorized roller which is operable to drive the different length rollers of the angled conveyor section via a plurality of different length belt strips reeved around the motorized roller and the different length rollers of the conveyor section. The angled conveyor section of the present invention thus provides a powered or motorized roller and a belt conveying surface which does not require special routing of the belt underneath the angled section to align the belt with the angled mating surface or edge.

These and other objects, advantages, purposes and features of the present invention will become apparent upon review of the following specification in conjunction with the drawings.

BRIEF DESCRIPTION OF THE DRAWINGS

FIG. 9 is a side elevation of the angled belt strip roller conveyor section of FIG. 8;

FIG. 10 is an end elevation of the angled belt strip roller conveyor section of FIGS. 8 and 9;

FIG. 11 is a sectional view of the angled belt strip roller conveyor section taken along the line XI—XI in FIG. 8; and FIG. 12 is a perspective view of another angled belt strip roller conveyor section in accordance with the present invention.

DESCRIPTION OF THE PREFERRED EMBODIMENTS

Figure 1:
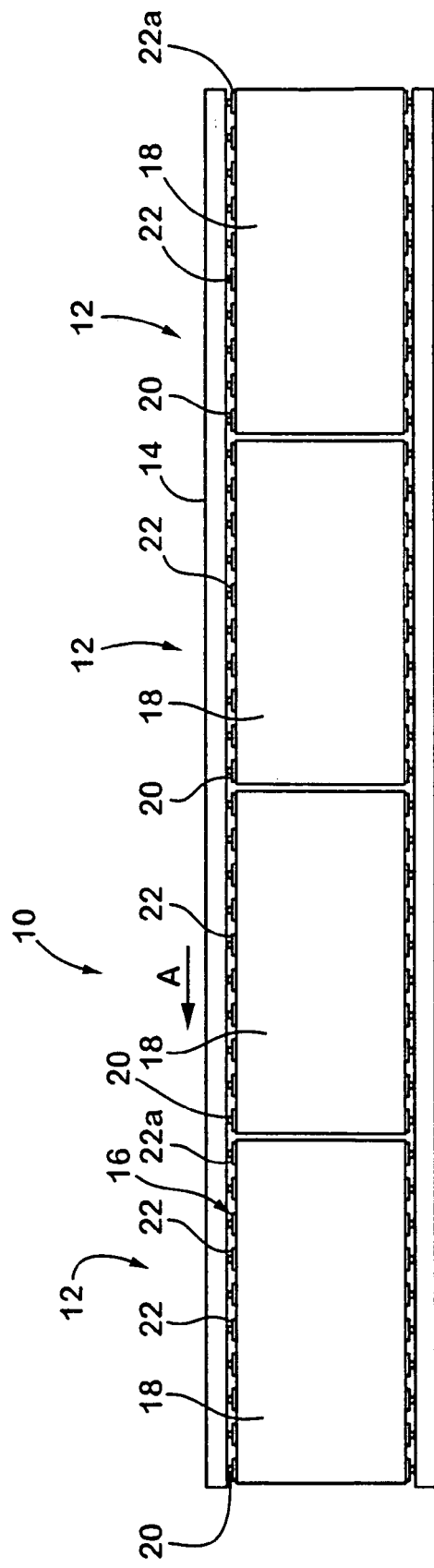
FIG. 1 is a top plan view of a portion of a segmented or zoned belt conveyor in accordance with the present invention.
Figure 2:
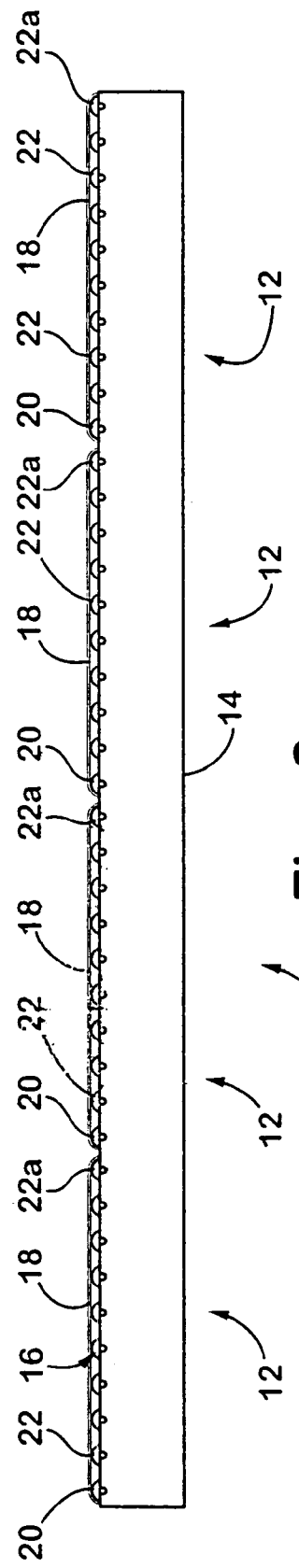
FIG. 2 is a side elevation of the portion of the belt conveyor of FIG. 1.

Referring now specifically to the drawings and the illustrative embodiments depicted therein, a belt conveyor or belt accumulator 10 includes one or more zones or segments 12 positioned along and between opposite sidewalls or side frames 14, and is operable to convey articles in a direction of conveyance A (FIGS. 1 and 2). Each segment or zone 12 includes a plurality of rollers 16 and a continuous belt 18 routed or reeved around the rollers 16. Each belted segment 12 may be independently operable to accumulate articles on the segment or zone or to move articles in the direction A onto a next, adjacent segment or zone or onto another conveyor, such as another belt conveyor, a roller conveyor, a slider bed, or the like, or any other means for receiving articles from a discharge end of the last zone or segment of the segmented belt conveyor 10. As best seen in FIG. 1, belt 18 may be wide enough to substantially cover the generally cylindrical roller portions of the rollers and thus may substantially span the spacing between the sidewalls 14 to provide a wide conveying surface for conveying articles along the roller conveyor.

Rollers 16 of each segment or zone 12 include a motorized roller 20 and one or more non-motorized or idler rollers 22. Motorized roller 20 may be the lead roller of the zone or positioned at a downstream end of each segment to pull the belt 18 (and the articles supported thereon) along the respective segment 12. Motorized roller 20 may comprise a self driven roller with an internal motor which is operable to rotate a roller portion relative to a shaft portion of the roller, such as a motorized roller of the types commercially available from various sources, such as Siemens Dematic Corporation, Rapistan Material Handling Automation Division of Grand Rapids, Mich.

For example, the roller may comprise a DC motorized roller, such as a 12 volt DC motorized roller or the like, such as a roller of the type disclosed in U.S. Pat. No. 6,244,427, the disclosure of which is hereby incorporated herein by reference. Optionally, the roller may comprise a 24 volt DC motorized roller or a 42 volt DC motorized roller or a 48 volt DC motorized roller or the like. For example, the motorized roller may comprise a 48 volt DC motorized roller (or a 24 volt DC motorized roller) having a diameter of approximately 50 mm and an overall width of between 500 mm and 900 mm. The 48 volt DC motorized roller may comprise a DC brushless motor and may be operable at speeds between approximately 130 rpm and 1150 rpm and may provide an output of approximately 3 Nm of torque at approximately 400 rpm and approximately 1.5 Nm of torque at approximately 1150 rpm. It is further envisioned that the motorized roller may comprise other DC powered motorized rollers, or may comprise an AC powered motorized roller, such as described in U.S. Pat. No. 5,442,248, the disclosure of which is hereby incorporated herein by reference, without affecting the scope of the present invention. The motor of the motorized roller may drive the roller directly, such as disclosed in U.S. Pat. No. 6,244,427, or may drive the roller via a gear train or the like, such as disclosed in U.S. Pat. No. 5,442,248, the disclosures of which are hereby incorporated herein by reference.

The motorized roller 20 thus drives the belt 18 which moves along the idler rollers 22, which freely rotate about their shaft portions to guide and support the belt 18 around the zone or segment 12. The idler rollers 22 may be any type of rollers, such as conventional, freely rotating rollers, such as the types also commercially available from various sources, such as Siemens Dematic Corporation, Rapistan Material Handling Automation Division of Grand Rapids, Mich. Although shown as having multiple idler rollers along each of the zones 12, one or more zones of the segmented belt conveyor of the present invention may include a support plate or slider bed between the motorized roller 20 and an opposite end idler roller 22a to support the belt 18 between the ends of the zone 12, without affecting the scope of the present invention.

Figure 3:
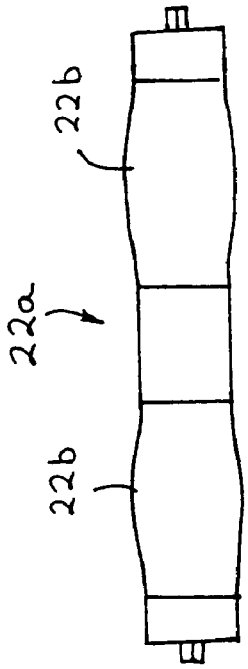
FIG. 3 is a side elevation of a tracking roller useful with the present invention.

As shown in FIG. 3, end idler roller 22a may comprise one or more crowns or bumps 22b along the roller to assist in tracking the belt 18 during operation of the roller conveyor. The bumps 22b may comprise one or more slightly larger diameter regions of the roller portion, such as two or three regions (or more or less depending on the length of the roller and the particular application) having, for example, approximately a 1–4 mm larger diameter than the diameter of the generally cylindrical portion of the idler roller, which may typically have a diameter of approximately 50 mm. The bumps or crowns may be formed as part of the roller portion or may comprise molded portions, such as molded polyurethane portions or the like, positioned along the roller, without affecting the scope of the present invention.

Belt 18 may comprise a low modulus belt 18. In the illustrated embodiment, belt 18 has a stretch capability or characteristic of at least approximately 1.5% stretch or more (and may have a stretch capability or characteristic of approximately 3% to 5% stretch or more) in its lengthwise direction. Belt 18 may be initially stretched as it is reeved around the rollers, such that the belt has an initial stretch of approximately 0.75% or more in its lengthwise direction when positioned around the rollers, and may be initially stretched to have an initial stretch of approximately 1% or 1.5%. Belt 18 provides a substantially greater amount of stretch over conventional conveyor belts, which typically may only provide approximately a 1% stretch characteristic or less, and typically may have an initial stretch of approximately 0.25% to 0.5% when reeved or positioned around the pulleys of a conventional belt conveyor. Low modulus belt 18 may be made from urethane extrusions or urethane with polyester or nylon tension members encapsulated or may be made from a rubber material or the like, and may be similar to the type of belts commercially available from Nitta Corporation for use in graphic arts and letter mail sorting. The low modulus characteristic of belt 18 and the approximately 0.75% or more initial stretch of belt 18 allows each zone 12 of the belt conveyor 10 to be operated with little or no take-up or adjustment being necessary to maintain the appropriate tension in the belt 18. However, such adjustment may be provided on belt conveyor 10, without affecting the scope of the present invention.

Each zone or segment 12 may also include a photo eye or sensor (not shown in FIGS. 1 and 2) for detecting articles or packages or the like on belt 18 of the respective zone. Belt conveyor 10 may further include a control for independently operating the motorized roller 20 of the respective zone to move the article along segment 12 and/or to temporarily stop the movement of the article or articles to accumulate articles on segment 12 in response to the sensor and depending on the particular application of segmented belt conveyor 10, as discussed in detail below with respect to the conveyor 110 of FIGS. 3 and 4.

Segmented belt conveyor 10 thus may be operable to accumulate articles on one or more of the segments or zones of the conveyor. Optionally, the segmented belt conveyor 10 may be operable on an incline or decline and may accumulate articles on the incline or decline. It is further envisioned that the segmented conveyor 10 may be operable to move articles, such as upward along an incline, as the articles are required by a downstream device or system. For example, the belt conveyor of the present invention may convey and feed stacks of trays to a tray destacking apparatus, such as a tray destacking apparatus of one of the types disclosed in commonly assigned, U.S. provisional applications, Ser. No. 60/275,789, filed Mar. 14, 2001 by Schiesser et al. for TRAY DESTACKER; and Ser. No. 60/297,516, filed Jun. 12, 2001 by Schiesser et al. for TRAY DESTACKER, and U.S. patent application, Ser. No. 10/095,829, filed Mar. 12, 2002 by Schiesser et al. for TRAY DESTACKER, now U.S. Pat. No. 6,846,153, which are hereby incorporated herein by reference in their entireties. The tray destacking apparatus may be operable to receive the stack of trays, separate and unstack each individual tray from the stack of trays and discharge the individual trays to an induct of a tray handling system or tray management system or the like, such as to an induct of a tray handling system at a mail sortation assembly. It is further envisioned that the belt conveyor of the present invention may be used in trailer loader or unloader applications, such as an extendable loader or unloader for extending the conveying surface from a support base outward and into a truck trailer or the like for loading or unloading articles into or out from the trailer, without affecting the scope of the present invention.

Figure 4:
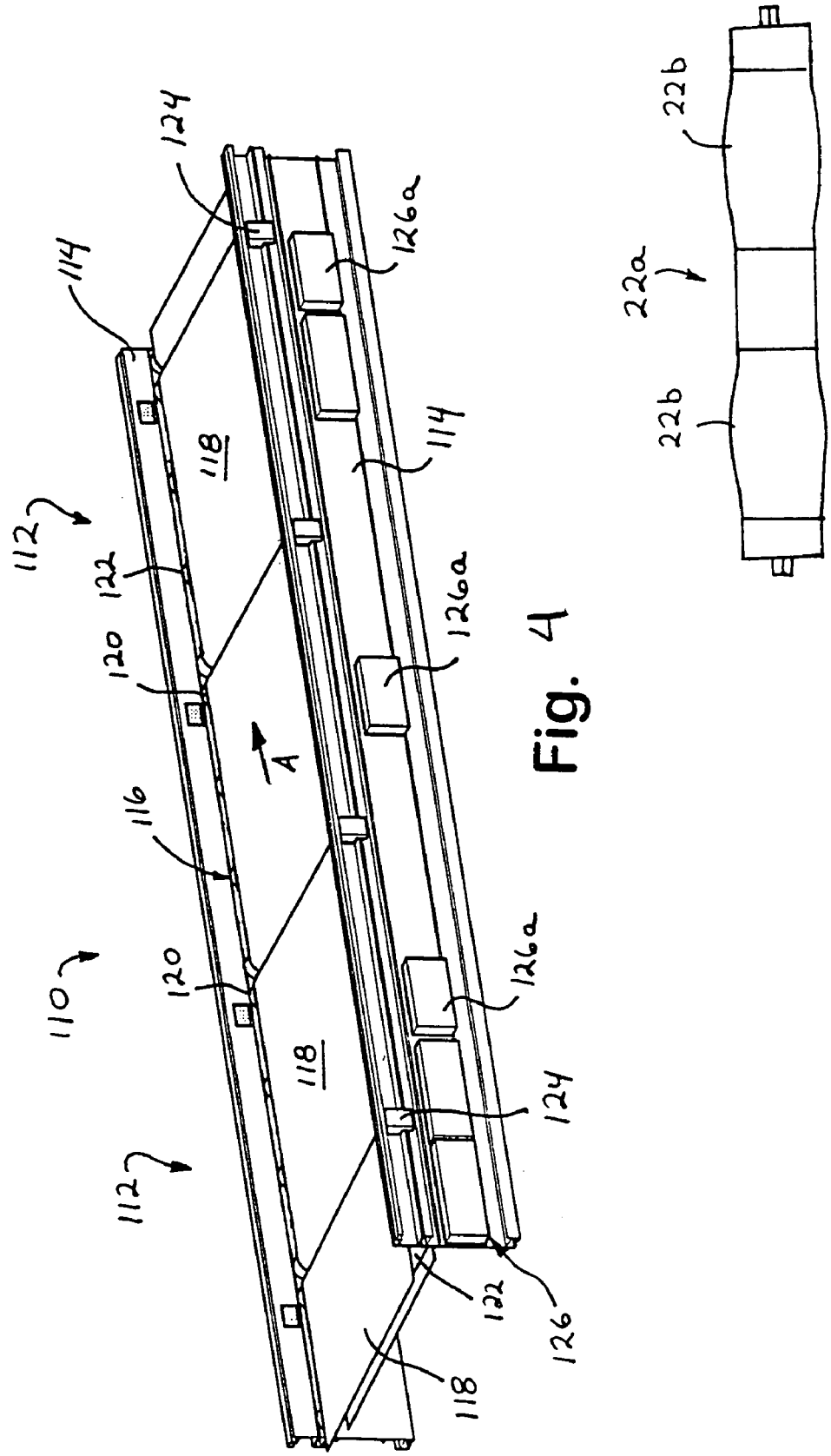
FIG. 4 is a perspective view of a belt conveyor in accordance with the present invention.
Figure 5:
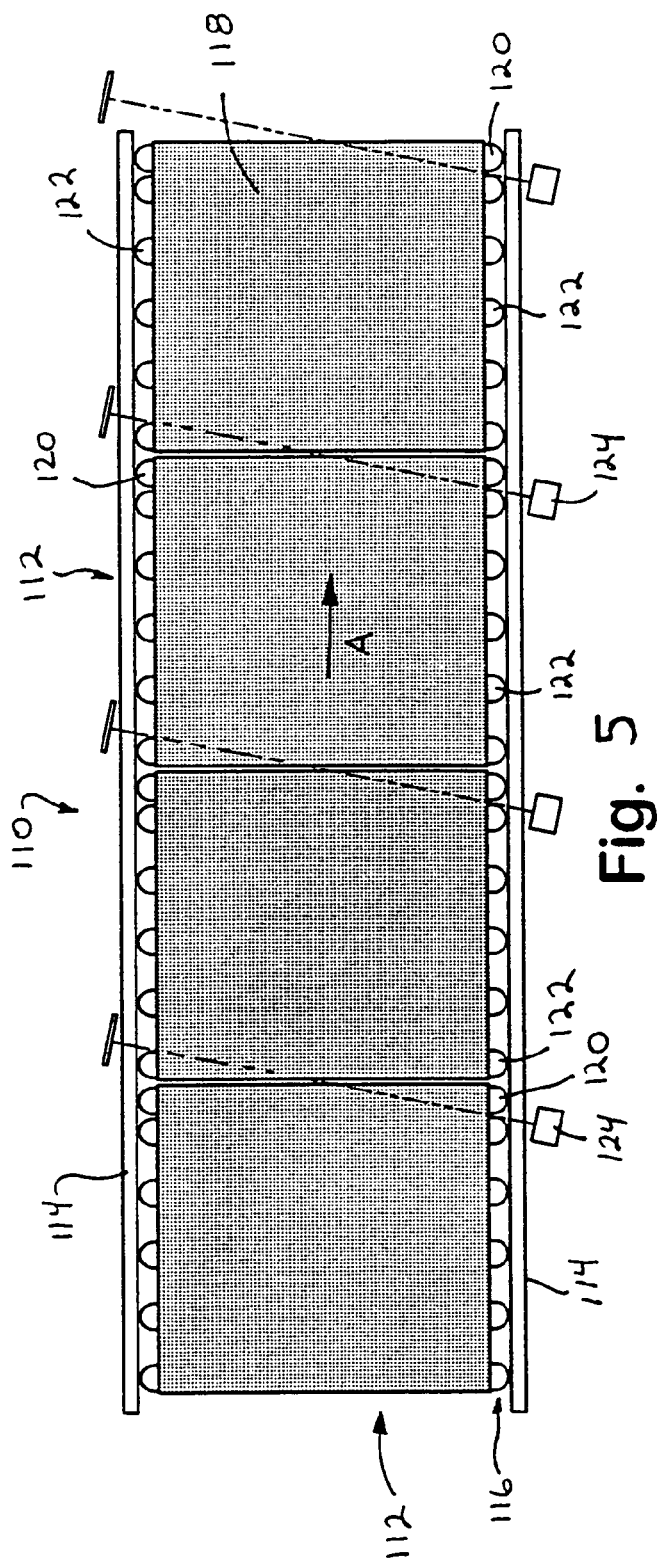
FIG. 5 is a top plan view of the belt conveyor of FIG. 4.

Referring now to FIGS. 4 and 5, a belt conveyor or belt accumulator 110 includes a plurality of tandem zones or segments 112 positioned along and between opposite sidewalls or side frames or channels 114 and is operable to convey articles along each zone in a direction of conveyance A. Each zone 112 comprises a plurality of rollers 116 and a continuous belt 118 routed or reeved around the rollers 116. Each belted zone 112 is independently operable to accumulate articles on the zone or to move articles in the direction A onto a next, adjacent zone or onto another conveyor, such as another belt conveyor, or a roller conveyor, slider bed, or the like, or any other means for receiving articles from a discharge end of the last zone of the belt conveyor 110.

In the illustrated embodiment of FIGS. 4 and 5, conveyor 110 is shown with five zones 112, with each zone 112 having a motorized roller 120 and a belt 118 and a product sensor 124 positioned at an end of the zone. However, the number of zones along a conveyor section is a function of the application and may vary without affecting the scope of the present invention.

Similar to rollers 16 of conveyor 10, discussed above, rollers 116 of each segment or zone 112 include a motorized roller 120 and at least one non-motorized or idler roller 122. Motorized roller 120 may be the lead roller of the zone or may be positioned at a downstream end of each segment to pull the belt 118 (and the articles supported thereon) along the respective zone 112. Similar to motorized roller 20, discussed above, motorized roller 120 may comprise a self driven roller with an internal motor which is operable to rotate a roller portion relative to a shaft portion of the roller, such as a motorized roller of the types commercially available from various sources, such as a 12 volt DC motorized roller or a 24 volt DC motorized roller or a 42 volt DC motorized roller or a 48 volt DC motorized roller or any voltage AC or DC powered motorized roller or the like. The motorized roller 120 thus drives the respective belt 118, which moves along the idler rollers 122, which freely rotate about their shaft portions to guide and support the belt 118 around and along the respective zone 112. The idler rollers 122 may comprise any type of non-driven rollers, such as conventional, freely rotating rollers or the like, and one or more of the rollers, such as an end idler roller, may include one or more crowns or bumps therealong to assist in tracking the belt, such as discussed above with respect to FIG. 3.

Figure 6:
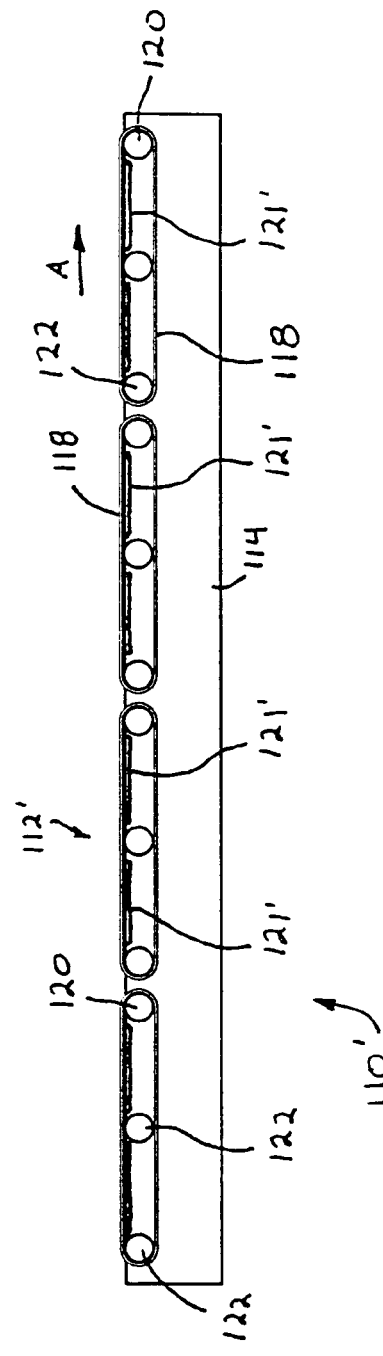
FIG. 6 is a side elevation of another belt conveyor in accordance with the present invention.
Figure 7:
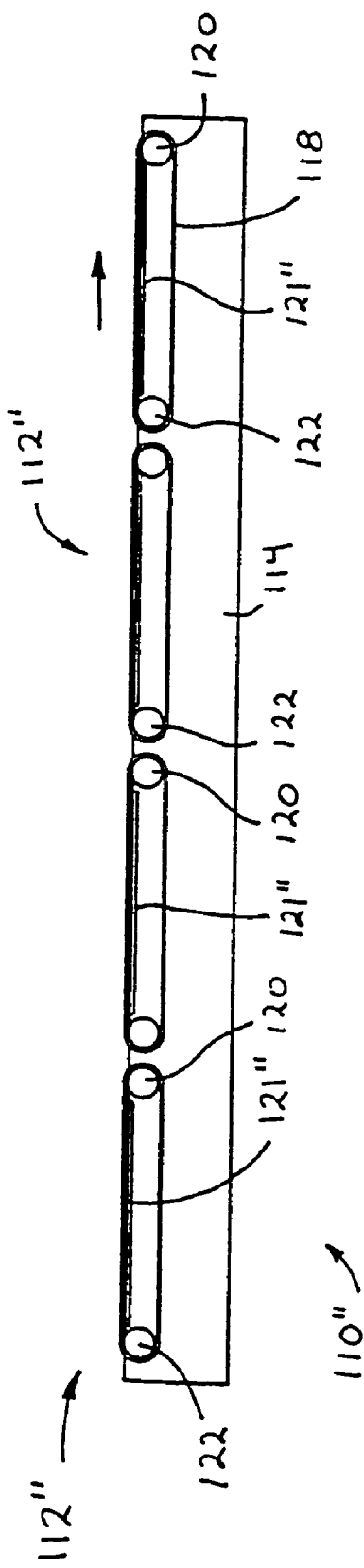
FIG. 7 is a side elevation of another belt conveyor in accordance with the present invention.

Although shown as having multiple idler rollers along each of the zones 112, a zone 112' of a belt conveyor 110' (FIG. 6) or a zone 112" of a belt conveyor 110" (FIG. 7) in accordance with the present invention may optionally include a slider bed between the motorized roller 120 and an idler roller 122 or between a pair of spaced apart idler rollers 122, such as slider bed 121' of FIG. 6, or between the motorized roller 120 and an opposite end idler roller 122 or the like, such as slider bed 121" of FIG. 7, to support the belt 118 between the rollers of the zone 112', without affecting the scope of the present invention. The slider bed or beds 121', 121" may comprise separate plates positioned between two consecutive rollers of a zone or may comprise a plate having a slot or opening therethrough for at least one roller, such as a center roller of the zone, to protrude upward partially through the opening to provide rolling support of the continuous belt along the slider bed, without affecting the scope of the present invention.

As discussed above, belt 118 may comprise a low modulus belt which may provide for approximately a 0.5% or more initial stretch or more in its lengthwise direction. In an exemplary embodiment, the belt may provide at least approximately a 1.5% to 5% or more stretch capability or characteristic in its lengthwise direction. In an exemplary embodiment, belt 118 may be stretched to have an initial stretch of approximately 1.5% when belt 118 is reeved around and positioned around the rollers of the conveyor. Low modulus belt 118 may be made from urethane extrusions or urethane with polyester or nylon tension members encapsulated, or may comprise a rubber material or the like, and may be similar to the type of belts commercially available from Nitta Corporation for use in graphic arts and letter mail sorting. The initial stretch and the low modulus characteristic of belt 118 allows each zone 112 of the belt conveyor 110 to be operated with little or no take-up or adjustment being necessary to maintain the appropriate tension in the belt 118. However, such take-up or adjustment may be provided on belt conveyor 110, without affecting the scope of the present invention.

Each zone or segment 112 of conveyor 110 includes a photo eye or article sensor 124 for detecting and/or monitoring articles or packages or the like on belt 118 of the respective zone. Belt conveyor 110 further includes a control 126 for independently operating the motorized roller 120 of the respective zone 112 to move the article along zone 112 and/or to temporarily stop the movement of the article or articles to accumulate articles on zone 112 in response to sensor 124 and depending on the particular application of segmented belt conveyor 110.

In the illustrated embodiment, control 126 comprises a motor control 126a at each zone 112 which is connected to each sensor 124 and the other motor controls 126a of the other zones. The motor controls 126a are thus in communication with one another to provide independent and synchronized or corresponding control of the motorized rollers of each zone, as discussed below. The motor controls 126a are connected to a power supply (not shown) which provides power to the sensors 124 and motor controls 126a.

The control and photo-eyes may be operable to accumulate articles on the zones of the belt conveyor, and may be operable to individually control operation of at least some of the zones, such as by utilizing accumulating logic and/or circuitry and the like, such as by utilizing the accumulating logic and/or principles disclosed in U.S. provisional application, Ser. No. 60/412,396, filed Sep. 20, 2002 by Haan et al, for CONVEYOR SYSTEM REVERSE-SLUG ACCUMULATION, which is hereby incorporated herein by reference. Article sensors 124 may be of the type disclosed in U.S. Pat. Nos. 5,582,286 and 6,253,909, and/or U.S. provisional application, Ser. No. 60/412,396, filed Sep. 20, 2002 by Haan et al, for CONVEYOR SYSTEM REVERSE-SLUG ACCUMULATION, which are hereby incorporated herein by reference.

In the illustrated embodiment, each article sensor 124 comprises a photosensor positioned at a downstream end of a respective zone 112 and operable to detect products or articles as they move from the downstream end of one zone to the upstream end of the adjacent zone. The motorized or driven roller 120 of a particular zone may be selectively activated or deactivated by control 126 in response to a corresponding article sensor 124, or in response to more than one of the article sensors positioned along the conveyor, to move or stop an article or articles that is/are present on the respective zone, as discussed below. Motorized rollers 120 thus may be directly driven and operable to selectively and independently convey or accumulate one or more articles on the associated conveyor zones in response to one or more of the article sensors 124.

For example, it is envisioned that the motorized rollers may be operable in a "sleep mode", such as described in U.S. Pat. Nos. 5,582,286 and 6,253,909, the disclosures of which are hereby incorporated herein by reference. In such a mode of operation, control 126 may activate the motorized roller of a particular zone in response to an article being detected at the beginning of the zone (or at the end of the immediate upstream zone) and may deactivate the motorized roller after the article is moved to the next or downstream zone, such that the motorized roller of a particular zone is only activated when an article is present at the zone and when the article is to be conveyed along the zones of the conveyor. If the downstream zones are not activated, then the motorized roller of the particular zone may be deactivated to accumulate the detected article or articles on that particular zone of the conveyor. Such a sleep mode operation thus only activates the motorized roller of a zone when an article to be conveyed is present at the particular zone, and thus reduces operation of the motorized rollers to increase the life cycle of the rollers.

The continuous belts of the belt conveyor of the present invention, and particularly the low modulus belts, may provide an increased coefficient of friction between the conveying or carrying surface of the belts and the products being conveyed therealong over the friction provided by rollers of conventional roller conveyors. The greater frictional resistance to sliding of the articles on the belts allows the belt conveyor of the present invention to operate at a greater speed than roller conveyors, without causing the products to slide along the zones. The greater frictional resistance also enhances the capability of the belt conveyor to move and accumulate articles along each zone individually and to move and accumulate articles on inclined or declined zones.

The belt conveyor of the present invention thus may be operable to accumulate articles on one or more of the segments or zones of the conveyor. Optionally, the belt conveyor may be operable on an incline or decline and may accumulate articles on the incline or decline. It is further envisioned that the belt conveyor of the present invention may be operable to move articles, such as upward along an incline, as the articles are required by a downstream device or system.

Therefore, the segmented or zoned belt conveyor of the present invention provides a plurality of independently operable zones or segments which may operate together as a generally continuously running belt conveyor or may operate individually as an accumulating conveyor with zone control and photo eyes. The present invention thus provides a zone controlled belt conveyor which may operate in a similar manner as a zone controlled roller conveyor, but with a continuous belt around the rollers rather than multiple O-rings or the like connecting the idler rollers to the motorized roller of each zone. The segmented belt conveyor of the present invention thus is capable of providing for accumulation of articles on an incline or decline. Because the motorized roller of each zone may only control or drive a small belt section, the load and wear on the motorized roller may be minimized to provide a longer life cycle for the motorized roller.

Referring now to FIGS. 8–11, a sorting and/or conveying system 210 includes a main conveyor or transport path 212 (shown in phantom in FIG. 8) and at least one angled discharge conveyor section 214 positioned at an angle with respect to main conveyor 212 and operable to convey and discharge articles from transport path 212. Angled conveyor section 214 includes a first sidewall 216 and a second sidewall 218 and an angled frame portion 220 positioned between an end 216a of first sidewall 216 and an end 218a of second sidewall 218. First sidewall 216 receives or mounts a shaft end of a plurality of rollers 222, while angled frame portion 220 and second sidewall 218 receive or mount the opposite shaft end of rollers 222, as discussed below. Angled conveyor section 214 provides an angled mating edge along frame portion 220 to provide an angled conveying surface at a side of transport path 212.

Sorting system 210 may include a plurality of sorting carriages (not shown) which are movable along transport path 212 and operable to discharge articles onto the angled conveyor section 214 as the articles and carriages are transported or moved along the transport path 212. The sorting carriages may comprise any known sorting carriages, such as tilt trays, crossbelt sorters, such as the type disclosed in U.S. Pat. No. 5,588,520, which is hereby incorporated herein by reference, double width crossbelt sorters, such as disclosed in U.S. patent application, Ser. No. 09/675,237, filed Sep. 29, 2000 by Edwards et al. for DOUBLE WIDTH CROSSBELT SORTER, now U.S. Pat. No. 6,478,138, which is hereby incorporated herein by reference, or the like, without affecting the scope of the present invention. Alternately, transport path 212 may comprise a conveying surface having discharge or diverting mechanisms or shoes or the like which are movable to guide or divert articles being conveyed along the conveying surface onto the angled discharge conveyor section, without affecting the scope of the present invention.

Angled conveyor section 214 may be positioned with one end 214a at an angle with respect to transport path 212, to receive articles at angled conveyor section 214. An opposite end 214b of angled conveyor section 214 may abut or align with another conveying surface or a discharge station or the like (not shown), without affecting the scope of the present invention.

The rollers 222 of angled conveyor section 214 include a driven roller or motorized roller 224 and a plurality of idler rollers 226. The shafts of the rollers may be mounted within holes or apertures (not shown) in the sidewalls 216, 218 and/or at the mounting portions 220a of angled frame 220, or may be mounted to the sidewalls 216, 218 and/or mounting portions 220a via any other mounting means, without affecting the scope of the present invention. The rollers 222 are mounted to sidewall 216 and sidewall 218 or angled frame 220 with their axes of rotation oriented generally orthogonal to the sidewalls 216, 218 and to direction of conveyance of angled conveyor section 214.

Idler rollers 226 include multiple different length rollers, 226a, 226b, 226c, 226d, 226e, 226f, 226g, which are mounted between first sidewall 216 and corresponding mounting portions 220a of angled frame 220 or sidewall 218. The different length rollers 226a–g are arranged in ascending length order along angled conveyor section 214, such that a shortest roller 226a is positioned toward one end of angled conveyor section 214, with the next shortest roller 226b positioned next to shortest roller 226a, and so on. The different length rollers 226a–g thus combine to form an angled conveying surface along angled frame 220. A single narrow roller or wheel 228 may be provided at or near the junction of angled frame 220 and first sidewall 216 to provide a conveying surface or support at that area. Depending on the desired length of angled conveyor section 214, one or more idler rollers 223 of generally the same length as the motorized roller 224 may be mounted between sidewalls 216, 218 (two idler rollers 223 are shown mounted in this manner in the illustrated embodiments of FIGS. 8–12).

Angled frame 220 extends at an angle between the ends 216a, 218a of sidewalls 216, 218 and includes a plurality of roller mounting portions or brackets or shaft supports 220a spaced therealong. Shaft supports 220a extend upward from angled frame 220 to receive the shaft ends of some of the idler rollers 226, and are positioned generally beneath the conveying surfaces of transport path 212 and angled conveyor section 214 so as not to interfere with the conveyance of articles from one of the conveyors to the other. Angled frame 220 and shaft supports 220a may include an upper support plate or support surface 220b which may be positioned at the ends of the rollers 226a–f and at wheel 228 to provide support at the generally triangular area at the end of each roller 226 and wheel 228 which would otherwise be open. This is best shown in FIG. 13 with reference to angled conveyor section 214′, discussed below.

Figure 8:
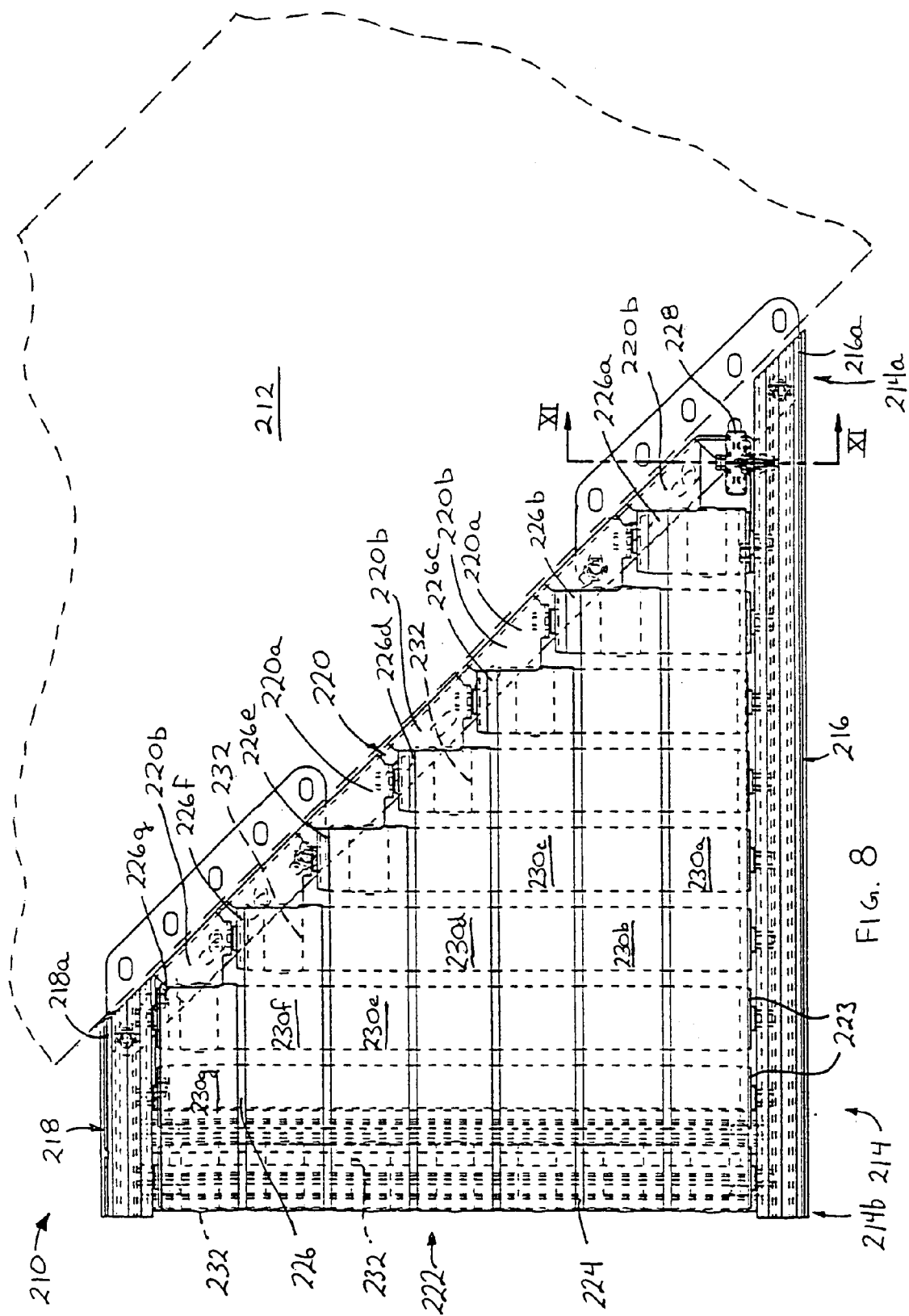
FIG. 8 is a plan view of an angled belt strip roller conveyor section in accordance with the present invention, as positioned at a transport path or conveyor of a sortation system.

Angled conveyor section 214 further includes a plurality of belt strips or tape strips 230a–g which are routed or reeved around the rollers 222 to define a belted conveying surface along angled conveyor section 214. Each of the belt strips 230 may have a different length from the other belt strips 230 and may be routed or reeved around a different set of rollers than the other belt strips 230, as shown in FIG. 8. For example, a longest belt strip 230a is routed or reeved around driven roller 224 and shortest idler roller 226a, while a second longest belt strip 230b is routed or reeved around driven roller 224 and the next shortest idler roller 226b, and so on. The belt strips are reeved around the motorized roller and their respective end rollers and at least some of the belt strips are supported by the idler rollers and/or the other different length rollers positioned between the motorized roller and the respective end rollers.

As discussed above with respect to belt 18, belt strips 230 may comprise a low modulus belt material. Belt strips 230 may have a stretch capability or characteristic of at least approximately 1.5% stretch or more (and may have a stretch capability or characteristic of approximately 3% to 5% stretch or more) in their lengthwise direction. Belt strips 230 may be initially stretched as they are reeved around the rollers, such that the belt strips have an initial stretch of approximately 0.75% or more in their lengthwise direction when positioned around the rollers, and may be initially stretched to have an initial stretch of approximately 1% or 1.5% or more. Low modulus belt strips 230 may be made from urethane extrusions or urethane with polyester or nylon tension members encapsulated or may be made from a rubber material or the like, and may be similar to the type of belts commercially available from Nitta Corporation for use in graphic arts and letter mail sorting.

In the illustrated embodiment, driven roller 224 is positioned at end 214b of angled conveyor section 214. Driven roller 224 thus is positioned at the discharge end of the angled conveyor section and operable to drive the upstream rollers via the belt strips 230. However, the driven roller may be positioned elsewhere along the angled conveyor section, and may be one of the shorter rollers mounted along the angled frame portion 220, without affecting the scope of the present invention.

Driven roller 224 may comprise a motorized roller, such as a motorized or self driven roller with a motor within the roller which is operable to rotate the roller portion of the roller relative to the shaft portion of the roller. For example, similar to motorized roller 20, discussed above, driven or motorized roller 224 may be of the type commercially available from various sources, such as an AC powered motorized roller or a DC powered motorized roller, such as a 12 volt DC motorized roller, a 24 volt DC motorized roller, a 42 volt DC motorized roller, a 48 volt DC motorized roller or the like, as discussed above with respect to motorized roller 20. Motorized roller 224 drives the belt strips or tape strips 230 around the idler rollers 223, 226, which freely rotate about their shaft portions in response to the movement or driving of the tape strips 230. The idler rollers 223, 226 may comprise conventional, freely rotating rollers, such as the types also commercially available from various sources.

Motorized roller 224 may include a plurality of tracking members 232, such as bands, crowns or crowned shells or the like, spaced along the motorized roller 224 for engaging and tracking the belt strips 230 on motorized roller 224. Likewise, each roller 226a–g may also include a tracking member 232, such as a band, crown or the like, at the location along the roller where a belt strip 230 reverses around that particular roller 226a–g (in other words, a tracking member may be positioned at each particular roller which defines an end roller or reversing roller for a respective belt strip). For example, roller 226a includes a tracking member 232 for belt strip 230a, roller 226b includes a tracking member 232 for belt strip 230b, and so on. The tracking members or strips or crowns 232 are not necessary elsewhere along the rollers, since the other portions of the rollers provide support for the belt, but do not require tracking means for tracking the belt around the roller.

During operation, motorized roller 224 is rotatably driven, which imparts movement of the continuous belt strips 230 and thus rotation of idler rollers 226 to convey articles discharged from transport path 212. The rollers 222 and belt strips 230 define a generally continuous conveying path for conveying articles along angled conveyor section 214 off from and away from transport path 212. Angled conveyor section 214 thus provides for a powered or driven discharge roller conveyor section and substantially precludes articles from falling between the rollers of the angled induct or discharge conveyor section. Because angled conveyor section 214 includes a driven or motorized roller, it is envisioned that the angled conveyor section of the present invention may comprise an induct conveying section to a main conveyor or transport path and may be operable to convey and induct articles from an induct station or conveyor onto carriages or onto a conveying surface of a transport or sorting system.

Referring now to FIG. 12, an angled conveyor section 214' includes a plurality of different length rollers 226' and a plurality of belt strips 230 reeved around particular sets of the different length rollers 226'. Angled conveyor section 214' is substantially similar to angled conveyor section 214 discussed above, such that a detailed discussion of the angled conveyor section will not be repeated herein. The reference numbers of angled conveyor section 214 of FIGS. 8–11 are assigned to similar or common parts of angled conveyor section 214' in FIG. 12.

Angled conveyor section 214' provides a different angle of discharge (or induct) relative to the associated transport or conveying path (not shown in FIG. 12), and includes a longer angled frame 220' than angled frame 220 of angled conveyor section 214, discussed above, positioned between the ends of opposite sidewalls (also not shown in FIG. 12) of the angled conveyor section 214'. Accordingly, the belt strips 230 are routed or reeved around different length rollers 226', whereby some of the different length rollers 226' may not define a reversing roller or end roller for a corresponding belt strip. Such an arrangement may provide for wider belt strips than may be suitable if each different length roller functioned as an end roller or reversing roller for a corresponding belt strip (as is the case with angled conveyor section 214 of FIGS. 8–11 and discussed above). The belt strips are reeved around the motorized roller and their respective end rollers and at least some of the belt strips are supported by the idler rollers and/or the other different length rollers positioned between the motorized roller and the respective end rollers.

Therefore, the angled conveyor section of the present invention provides a substantially continuous, belted conveying surface at an angle for abutting or mating against a main conveying path. The angled conveyor section may include a motorized roller which is operable to drive the different length rollers of the angled conveyor section via a plurality of different length belt strips reeved around the motorized roller and the different length rollers of the conveyor section. The angled conveyor section of the present invention thus may be operable to convey articles at a discharge of a transport path or conveying path of a sorting or transporting system, or may be operable to convey and induct articles onto a transport path or conveying path of a sorting or transporting system. The angled conveyor section of the present invention thus provides a powered or driven or motorized roller and a belt conveying surface which does not require special routing of the belt underneath the angled section to align the belt with the angled mating surface or edge. The belt strips are supported by some of the other different length rollers positioned between the motorized roller and the respective end rollers to provide support of articles as they are moved along the belt strips.

Changes and modifications in the specifically described embodiments may be carried out without departing from the principles of the present invention, which is intended to be limited only by the scope of the appended claims, as interpreted according to the principles of patent law.

The embodiments of the present invention in which an exclusive property or privilege is claimed are defined as follows:

1. A belt conveyor having opposite sidewalls, said belt conveyor comprising:

a motorized roller and at least one other roller positioned along and between the opposite sidewalls;

a continuous conveying belt reeved around said motorized roller and said at least one idler roller, said conveying belt defining a conveying surface between the opposite sidewalls of said belt conveyor, said motorized roller being operable to drive said conveying belt to move articles on said conveying belt along said belt conveyor, said motorized roller engaging a surface of said conveying belt to drive said conveying belt via rotation of a roller portion of said motorized roller, said conveying belt having a low modulus characteristic, wherein said conveying belt is initially stretched in a lengthwise direction of said conveying belt at least 0.75% when said conveying belt is reeved around said rollers; and wherein said conveying belt is tracked around said rollers via engagement of a surface of said conveying belt with said rollers and without a take up device, said low modulus characteristic of said conveying belt providing at least partial tracking of said conveying belt around said rollers.

2. The belt conveyor of claim 1, wherein said belt is initially stretched in a lengthwise direction of said belt at least 1% when said belt is reeved around said rollers.

3. The belt conveyor of claim 1, wherein said belt is initially stretched in a lengthwise direction of said belt at least 1.5% when said belt is reeved around said rollers.

4. The belt conveyor of claim 1, wherein said low modulus characteristic of said belt provides at least a 2% stretch characteristic to said belt.

5. The belt conveyor of claim 1, wherein said low modulus characteristic of said belt provides at least a 4% stretch characteristic to said belt.

6. The belt conveyor of claim 1, wherein said belt has a width which spans substantially the spacing between said sidewalls.

7. The belt conveyor of claim 1 including an article sensor which is operable to detect articles on said belt.

8. The belt conveyor of claim 7 including a control which is operable to control said motorized roller in response to said article sensor.

9. The belt conveyor of claim 1, wherein said conveyor is operable to accumulate articles on said belt.

10. The belt conveyor of claim 1, wherein said motorized roller comprises one of an AC motor, a 12 volt DC motor, a 24 volt DC motor, a 42 volt DC motor and a 48 volt DC motor.

11. The belt conveyor of claim 1, wherein said motorized roller comprises a 24 volt DC motor.

12. The belt conveyor of claim 1, wherein said motorized roller comprises one of a 42 volt DC motor and a 48 volt DC motor.

13. The belt conveyor of claim 1, wherein at least one of said motorized roller and said at least one other roller has at least one crown for partially tracking said belt.

14. The belt conveyor of claim 1 including at least one slider plate between two of said motorized roller and said at least one other roller for supporting said continuous belt between the two rollers.

15. The belt conveyor of claim 1 including a plurality of spaced apart support rollers supporting said continuous belt.

16. The belt conveyor of claim 1, wherein at least one of said motorized roller and said at least one other roller has at least two crowns established thereon for partially tracking said conveying belt around said rollers.

17. A belt conveyor having opposite sidewalls, said belt conveyor comprising:
 a motorized roller and at least one other roller positioned along and between the opposite sidewalls; and
 a continuous conveying belt reeved around said motorized roller and said at least one idler roller, said conveying belt defining a conveying surface between the opposite sidewalls of said belt conveyor, said motorized roller being operable to drive said conveying belt to move articles on said conveying belt along said belt conveyor, said conveying belt having a low modulus characteristic, wherein said conveying belt is initially stretched in a lengthwise direction of said conveying belt at least 0.75% when said conveying belt is reeved around said rollers, said conveying bolt being tracked around said rollers via engagement of a surface of said conveying belt with said rollers and without a take up device for adjusting a tension in said conveying belt, said low modulus characteristic of said conveying belt providing at least partial tracking of said conveying belt around said rollers.

18. The belt conveyor of claim 17, wherein said motorized roller engages a surface of said conveying belt to drive said conveying belt via rotation of a roller portion of said motorized roller.

19. The belt conveyor of claim 17, wherein at least one of said motorized roller and said at least one other roller has at least one crown established thereon for partially tracking said conveying belt around said rollers.

20. The belt conveyor of claim 17, wherein at least one of said motorized roller and said at least one other roller has at least two crowns established thereon for partially tracking said conveying belt around said rollers.

21. The belt conveyor of claim 17, wherein said conveying belt has a width which spans substantially the spacing between said sidewalls.

22. The belt conveyor of claim 17 including an article sensor which is operable to detect articles on said conveying belt, said belt conveyor including a control which is operable to control said motorized roller in response to said article sensor, wherein said belt conveyor is operable to accumulate articles on said conveying belt.

23. A belt conveyor having opposite sidewalls, said belt conveyor comprising:
 a motorized roller and at least one other roller positioned along and between the opposite sidewalls;
 a continuous conveying belt reeved around said motorized roller and said at least one idler roller, said conveying belt defining a conveying surface between the opposite sidewalls of said belt conveyor, said motorized roller being operable to drive said conveying belt to move articles on said conveying belt along said belt conveyor, said conveying belt having a low modulus characteristic, wherein said conveying belt is initially stretched in a lengthwise direction of said conveying belt at least 0.75% when said conveying belt is reeved around said rollers, wherein at least one of said motorized roller and said at least one other toiler has at least two crowns established thereon for tracking said conveying belt around said rollers; and
 wherein said conveying belt is tracked around said rollers via engagement of a surface of said conveying belt with said rollers and without a take up device for adjusting a tension in said conveying belt, said low modulus characteristic of said conveying belt providing at least partial tracking of said conveying belt around said rollers.

24. The belt conveyor of claim 23, wherein said motorized roller engages a surface of said conveying belt to drive said conveying belt via rotation of a roller portion of said motorized roller.

25. The belt conveyor of claim 23, wherein said conveying belt has a width which spans substantially the spacing between said sidewalk.

26. The belt conveyor of claim 23 including an article sensor which is operable to detect articles on said conveying belt, said belt conveyor including a control which is operable to control said motorized roller in response to said article sensor, wherein said belt conveyor is operable to accumulate articles on said conveying belt.

* * * * *

UNITED STATES PATENT AND TRADEMARK OFFICE
CERTIFICATE OF CORRECTION

PATENT NO. : 7,093,709 B2  Page 1 of 1
APPLICATION NO. : 10/975199
DATED : August 22, 2006
INVENTOR(S) : Cotter et al.

It is certified that error appears in the above-identified patent and that said Letters Patent is hereby corrected as shown below:

Column 15
Claim 17, Line 25, "bolt" should be --belt--

Column 16
Claim 23, Line 22, "toiler" should be --roller--
Claim 25, Line 38, "sidewalk" should be --sidewalls--

Signed and Sealed this

Seventeenth Day of June, 2008

JON W. DUDAS
*Director of the United States Patent and Trademark Office*